United States Patent
Maekawa

(10) Patent No.: US 11,697,423 B2
(45) Date of Patent: Jul. 11, 2023

(54) IN-VEHICLE COMMUNICATION SYSTEM, IN-VEHICLE RELAY APPARATUS, AND IN-VEHICLE CONTROL APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kosei Maekawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 95 days.

(21) Appl. No.: 17/442,942

(22) PCT Filed: Jan. 22, 2020

(86) PCT No.: PCT/JP2020/002145
§ 371 (c)(1),
(2) Date: Sep. 24, 2021

(87) PCT Pub. No.: WO2020/195066
PCT Pub. Date: Oct. 1, 2020

(65) Prior Publication Data
US 2022/0126846 A1     Apr. 28, 2022

(30) Foreign Application Priority Data
Mar. 27, 2019 (JP) .................. 2019-060936

(51) Int. Cl.
*B60W 50/00*     (2006.01)
*B60W 50/023*    (2012.01)
(Continued)

(52) U.S. Cl.
CPC ....... *B60W 50/023* (2013.01); *B60R 16/0231* (2013.01); *B60W 50/0205* (2013.01); *B60W 60/005* (2020.02); *H04L 12/40045* (2013.01)

(58) Field of Classification Search
CPC .......... B60W 50/023; B60W 50/0205; B60W 60/005; B60R 16/0231; H04L 12/40045;
(Continued)

(56) References Cited

U.S. PATENT DOCUMENTS

2013/0044840 A1*  2/2013  Yamamoto .......... H04L 27/2662
                                                     375/340
2018/0304828 A1  10/2018  Kitani et al.

FOREIGN PATENT DOCUMENTS

JP    2009-262609 A    11/2009
JP    2014-118072 A     6/2014
(Continued)

OTHER PUBLICATIONS

International Search Report, Application No. PCT/JP2020/002145, dated Apr. 7, 2020. ISA/Japan Patent Office.

*Primary Examiner* — Ian Jen
(74) *Attorney, Agent, or Firm* — Honigman LLP

(57) ABSTRACT

An in-vehicle communication system includes a first relay apparatus installed in a first area of a vehicle, and a second relay apparatus installed in a second area and are connected via a communication main line. A main control apparatus and an auxiliary control apparatus are connected to the first relay apparatus and a controlled apparatus is connected to the second relay apparatus, each connected via a communication branch line. The first input apparatus is installed in the first area and inputs information to the main control apparatus and the auxiliary control apparatus. The second input apparatus is installed in the second area and inputs information to the main control apparatus and the auxiliary control apparatus via the first relay apparatus and the second (Continued)

relay apparatus. The first relay apparatus and the controlled apparatus communicate via an auxiliary communication line provided into both the first area and the second area.

15 Claims, 6 Drawing Sheets

(51) Int. Cl.
*B60W 60/00* (2020.01)
*B60R 16/023* (2006.01)
*B60W 50/02* (2012.01)
*H04L 12/40* (2006.01)

(58) Field of Classification Search
CPC . H04L 2012/40215; H04L 2012/40273; H04L 12/40189; H04B 1/74; H04B 3/36
See application file for complete search history.

(56) References Cited

FOREIGN PATENT DOCUMENTS

| | | |
|---|---|---|
| JP | 2015-067187 A | 4/2015 |
| WO | 2019-004173 A1 | 1/2019 |

\* cited by examiner

IN-VEHICLE COMMUNICATION SYSTEM, IN-VEHICLE RELAY APPARATUS, AND IN-VEHICLE CONTROL APPARATUS

CROSS-REFERENCE TO RELATED APPLICATIONS

This application is the U.S. national stage of PCT/JP2020/002145 filed on Jan. 22, 2020, which claims priority of Japanese Patent Application No. JP 2019-060936 filed on Mar. 27, 2019, the contents of which are incorporated herein.

TECHNICAL FIELD

The present disclosure relates to an in-vehicle communication system for a plurality of apparatuses installed in a vehicle to communicate via a communication line and an in-vehicle relay apparatus and an in-vehicle control apparatus constituting the system.

BACKGROUND

In recent years, the number of Electronic Control Units (ECU) and other similar apparatuses installed in a vehicle has been increasing. These apparatuses communicate with other apparatuses, exchanges information, and executes various processing. With the increase in the number of apparatuses in a vehicle, the number of communication lines inside vehicles provided for communication by the apparatuses has also increased.

In JP 2015-67187A, a vehicle control system is described which has a configuration in which the inside of a vehicle is divided into a plurality of regions, in each region, a plurality of functional ECUs are connected to a relay ECU on a first network, and the plurality of relay ECUs are connected to one another on a second network.

In the vehicle control system described in JP 2015-67187A, an abnormality may occur in the communication line between the relay ECUs, such as a short circuit or wire breakage. Also, in this vehicle control system, an abnormality may occur in the communication integrated circuit (IC) for transmitting and receiving messages using a communication line. In a case where such an abnormality occurs, in the vehicle control system, the transmitting and receiving of messages between a first network function ECU and a second network function ECU may fail.

The present disclosure was made in light of such circumstances and is directed at providing an in-vehicle communication system, an in-vehicle relay apparatus, and an in-vehicle control apparatus with expected enhanced reliability of in-vehicle communication.

SUMMARY

An in-vehicle communication system according to the present embodiment includes: a first relay apparatus installed in a first area of a vehicle; a second relay apparatus installed in a second area of the vehicle, the second relay apparatus being connected to the first relay apparatus via a communication main line that runs into both the first area and the second area; a main control apparatus and an auxiliary control apparatus installed in the first area, the main control apparatus and the auxiliary control apparatus being connected to the first relay apparatus via a communication branch line and performing driving control of the vehicle; a controlled apparatus installed in the second area, the controlled apparatus being connected to the second relay apparatus via a communication branch line and being controlled by the main control apparatus or the auxiliary control apparatus; a first input apparatus installed in the first area, the first input apparatus inputting information used in the driving control to the main control apparatus or the auxiliary control apparatus; and a second input apparatus installed in the second area, the second input apparatus being connected to the second relay apparatus via a communication branch line and inputting information used in the driving control to the main control apparatus or the auxiliary control apparatus via the first relay apparatus and the second relay apparatus, wherein the first relay apparatus and the controlled apparatus communicate via an auxiliary communication line provided running into both the first area and the second area; in a case where communications via the communication main line are not possible, the main control apparatus and the auxiliary control apparatus communicate with the controlled apparatus via the auxiliary communication line; and in a case where the main control apparatus cannot control the controlled apparatus, the auxiliary control apparatus controls the controlled apparatus.

The present application can be realized not only as an in-vehicle relay apparatus or an in-vehicle control apparatus with the advantageous processing unit described above, but also as a communication method including such advantageous processing steps and a computer program for causing a computer to execute these steps. Also, a portion or all of these apparatuses can be realized as a semiconductor integrated circuit or as other apparatuses or a system that includes these apparatuses.

Advantageous Effects of Invention

According to the foregoing, enhanced reliability of in-vehicle communications can be expected.

DETAILED DESCRIPTION OF PREFERRED EMBODIMENTS

Figure 1:
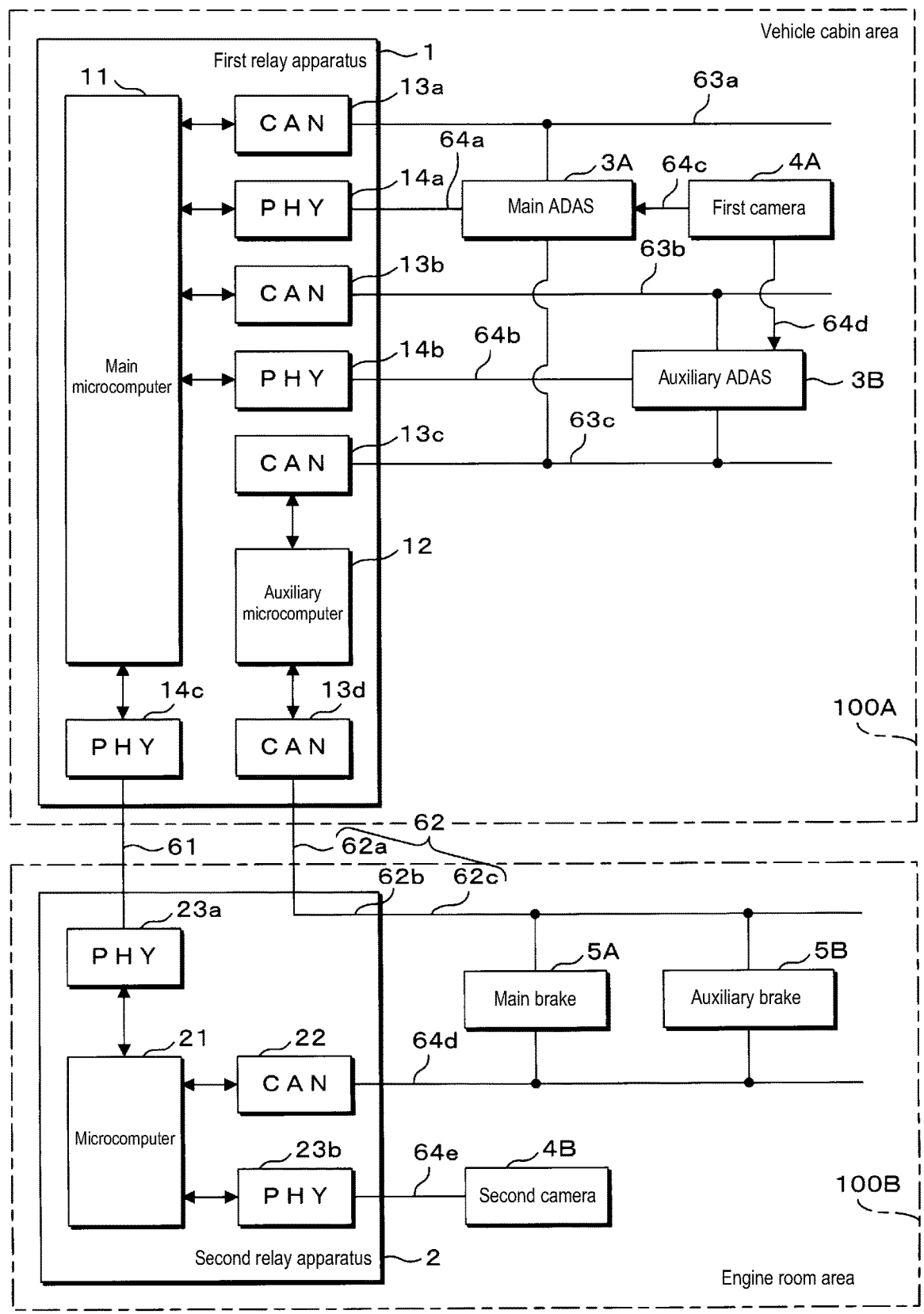
FIG. 1 is a block diagram illustrating the configuration of an in-vehicle communication system according to the present embodiment.

Firstly, embodiments of the present disclosure will be listed and described. One or more parts of the embodiments described below may be combined in a discretionary manner.

An in-vehicle communication system according to the present embodiment includes: first relay apparatus installed in a first area of a vehicle; a second relay apparatus installed in a second area of the vehicle, the second relay apparatus being connected to the first relay apparatus via a communication main line that runs into both the first area and the second area; a main control apparatus and an auxiliary control apparatus installed in the first area, the main control apparatus and the auxiliary control apparatus being connected to the first relay apparatus via a communication branch line and performing driving control of the vehicle; a controlled apparatus installed in the second area, the controlled apparatus being connected to the second relay apparatus via a communication branch line and being controlled by the main control apparatus or the auxiliary control apparatus; a first input apparatus installed in the first area, the first input apparatus inputting information used in the driving control to the main control apparatus or the auxiliary control apparatus; and a second input apparatus installed in the second area, the second input apparatus being connected to the second relay apparatus via a communication branch line and inputting information used in the driving control to the main control apparatus or the auxiliary control apparatus via the first relay apparatus and the second relay apparatus, wherein the first relay apparatus and the controlled apparatus communicate via an auxiliary communication line provided running into both the first area and the second area; in a case where communications via the communication main line are not possible, the main control apparatus and the auxiliary control apparatus communicate with the controlled apparatus via the auxiliary communication line; and in a case where the main control apparatus cannot control the controlled apparatus, the auxiliary control apparatus controls the controlled apparatus.

In the present aspect, the area inside the vehicle where various apparatuses, such as a control apparatus and a relay apparatus, can be installed is divided in at least two areas, the first area and the second area. In the first area, the main control apparatus and the auxiliary control apparatus that perform driving control of the vehicle, the first relay apparatus that relays communications, and the first input apparatus that inputs information used in the driving control are installed. In the second area, the controlled apparatus controlled by the control apparatuses, the second relay apparatus that relays communications, and the second input apparatus that inputs information used in the driving control are installed. The first relay apparatus and the second relay apparatus are connected via the communication main line running into both the first area and the second area. The first relay apparatus and the controlled apparatus are connected via the auxiliary communication line running into both the first area and the second area.

In this manner, the main control apparatus and the auxiliary control apparatus provided in the first area can communicate with the controlled apparatus provided in the second area using two communication paths, the communication path via the communication main line and the communication path via the auxiliary communication line. Even in a case where a malfunction has occurred in either one of the communication paths, the main control apparatus and the auxiliary control apparatus can communicate with the controlled apparatus using the other communication path. Thus, the reliability relating to the in-vehicle communication system communications can be enhanced.

Even in a case where a malfunction has occurred in either one of the controlled apparatuses, because two control apparatuses, the main control apparatus and the auxiliary control apparatus, are installed in the vehicle, the controlled apparatus can be controlled by the other control apparatus.

Even in a case where a malfunction has occurred in either one of the input apparatuses, because the first input apparatus is provided in the first area and the second input apparatus is provided in the second area, information can be input by the other input apparatus to the main control apparatus and the auxiliary control apparatus.

Preferably, the auxiliary communication line includes a first auxiliary communication line that connects the first relay apparatus and the second relay apparatus and runs into both the first area and the second area, a second auxiliary communication line that connects the second relay apparatus and the controlled apparatus, and internal wiring provided inside the second relay apparatus that electrically connects the first auxiliary communication line and the second auxiliary communication line.

In the present aspect, the auxiliary communication line that connects the main control apparatus and the auxiliary control apparatus in the first area and the controlled apparatus in the second area may be provided divided into two or more lines. For example, the auxiliary communication line may include the first auxiliary communication line that connects the first relay apparatus and the second relay apparatus, the second auxiliary communication line that connects the second relay apparatus and the controlled apparatus, and internal wiring inside the second relay apparatus that electrically connects the first auxiliary communication line and the second auxiliary communication line. In this manner, because the communication main line and the auxiliary communication line provided running into both the first area and the second area of the vehicle are both connected to the first relay apparatus and the second relay apparatus, connecting the communication lines and the like can be simplified.

Preferably, the communication main line is a high-speed communication line that connects the first relay apparatus and the second relay apparatus as a pair, and the auxiliary communication line is a bus-type low-speed communication line that connects the first relay apparatus and the controlled apparatus.

In the present aspect, the communication main line is a high-speed communication line that connects as a pair the first relay apparatus and the second relay apparatus. For example, the communication main line is a communication line compliant with Ethernet (registered trademark) communication standards. The auxiliary communication line is a bus-type low-speed communication line that connects the first relay apparatus and one or more controlled apparatuses. For example, the auxiliary communication line is a communication line compliant with controller area network (CAN) communication standards. Accordingly, an increase in the cost of the in-vehicle communication system can be expected to be suppressed by providing the auxiliary communication line.

Preferably, the first relay apparatus includes a main processing unit, an auxiliary processing unit, a main power supply circuit, and an auxiliary power supply circuit; the main processing unit executes processing to relay communications between the main control apparatus and the auxiliary control apparatus and the second relay apparatus via the communication main line; the auxiliary processing unit executes processing to relay communications between the main control apparatus and the auxiliary control apparatus and the controlled apparatus via the auxiliary communication line; the main power supply circuit supplies power to the main processing unit; and the auxiliary power supply circuit supplies power to the auxiliary processing unit.

In the present aspect, the first relay apparatus is provided with two processing units, the main processing unit and the auxiliary processing unit, and two power supply circuits, the main power supply circuit and the auxiliary power supply circuit. The main processing unit executes processing to relay communications between the main control apparatus and the auxiliary control apparatus and the second relay apparatus via the communication main line. The auxiliary processing unit executes processing to relay communications between the main control apparatus and the auxiliary control apparatus and the controlled apparatus via the auxiliary communication line. The main power supply circuit supplies power to the main processing unit. The auxiliary power supply circuit supplies power to the auxiliary processing unit. By two sets of a processing unit and a power supply circuit being provided in the first relay apparatus, the resistance against the first relay apparatus malfunctioning or the like can be increased.

Preferably, the auxiliary processing unit determines whether or not there is an abnormality in the main processing unit and, in a case where there is an abnormality, executes relay processing via the auxiliary communication line.

In the present aspect, the auxiliary processing unit of the first relay apparatus determines whether or not there is an abnormality relating to the processing of the main processing unit. In a case where it is determined that there is an abnormality, the auxiliary processing unit executes relay processing via the auxiliary communication line. In this manner, the first relay apparatus can determine whether to communicate via the communication main line or via the auxiliary communication line and switch accordingly.

Preferably, the main control apparatus and the auxiliary control apparatus each are an apparatus that performs driving control relating to automated driving of the vehicle, determine whether or not communications via the communication main line and the auxiliary communication line are possible in a case where a request to switch the vehicle from manual driving to automated driving is received, and perform switching to automated driving in a case where communications via the communication main line and the auxiliary communication line are possible.

In the present aspect, the vehicle is a vehicle installed with an automated driving function and can switch between automated driving and manual driving depending on the occupant of the vehicle. The main control apparatus and the auxiliary control apparatus perform driving control relating to the automated driving of the vehicle. In a case where a request to switch from manual driving to automated driving is received, the main control apparatus and the auxiliary control apparatus determine whether or not communication via the communication main line and communication via the auxiliary communication line are possible. In a case where communication via both the communication main line and the auxiliary communication line is possible, the main control apparatus and the auxiliary control apparatus perform switching to automated driving. In a case where communication via either the communication main line or the auxiliary communication line is not possible, the main control apparatus and the auxiliary control apparatus do not perform switching to automated driving. In this manner, switching to automated driving in a reduced communication reliability state can be prevented.

An in-vehicle relay apparatus according to the present aspect is an in-vehicle relay apparatus installed in a vehicle including: a main processing unit; an auxiliary processing unit; a main power supply circuit; and an auxiliary power supply circuit, wherein the main power supply circuit supplies power to the main processing unit; the auxiliary power supply circuit supplies power to the auxiliary processing unit; the main processing unit executes processing to relay, via a communication main line, communications between a main control apparatus and an auxiliary control apparatus that perform driving control of the vehicle and another relay apparatus connected with a controlled apparatus controlled by the main control apparatus and the auxiliary control apparatus; and the auxiliary processing unit determines whether or not there is an abnormality in processing relating to relay by the main processing unit and, in a case where there is an abnormality, executes processing to relay, via an auxiliary communication line, communications between the main control apparatus and the auxiliary control apparatus and the controlled apparatus.

In the present aspect, in a similar manner to the fourth aspect, resistance against the in-vehicle relay apparatus malfunctioning or the like can be increased.

An in-vehicle control apparatus according to the present aspect is an in-vehicle control apparatus installed in a vehicle capable of switching between automated driving and manual driving for performing driving control of the vehicle, including: a processing unit, wherein the processing unit determines whether or not communications with a controlled apparatus via a communication main line and communications with the controlled apparatus via an auxiliary communication line are possible in a case where a request to switch the vehicle from manual driving to automated driving is received, and performs switching to automated driving in a case where communications via the communication main line and the auxiliary communication line are possible.

In the present aspect, in a similar manner to the sixth aspect, switching to automated driving in a reduced communication reliability state can be prevented.

A specific example of an in-vehicle communication system according to an embodiment of the present disclosure will be described with reference to the drawings. The present disclosure is not limited to these examples. The present invention is defined by the scope of the claims, and all modifications that are equivalent to or within the scope of the claims are included.

System Configuration

FIG. 1 is a block diagram illustrating the configuration of an in-vehicle communication system according to the present embodiment. The in-vehicle communication system according to the present embodiment is a system for a plurality of communication apparatuses installed in a vehicle with an automated driving function to communicate with one another. In a vehicle, there are multiple places where communication apparatuses are installed. In the present embodiment, a plurality of communication apparatuses can be installed in both a vehicle cabin area 100A and an engine room area 100B of the vehicle. The vehicle cabin area 100A includes the space where the occupants of the vehicle sit and the space therearound. The engine room area 100B is the space provided at the front portion of the vehicle, for example, where the prime mover, such as an engine or a motor, is installed. The vehicle cabin area 100A and the engine room area 100B are divided by a wall member, for example. A through-hole is formed in the wall member. Wires, such as a communication line, an electric power line, and the like, are passed through the through-hole, and the vehicle cabin area 100A and the engine room area 100B are electrically connected via these wires.

In the present embodiment, in the vehicle cabin area 100A, a first relay apparatus 1, main advanced driver-assistance systems (ADAS) 3A, auxiliary ADAS 3B, a first camera 4A, and the like are installed. In the engine room area 100B, a second relay apparatus 2, a second camera 4B, a main brake control apparatus 5A, an auxiliary brake control apparatus 5B, and the like are installed. Note that in FIG. 1, the main brake control apparatus is shortened to "main brake", and the auxiliary brake control apparatus is shortened to "auxiliary brake". The plurality of apparatuses installed in the vehicle are connected appropriately via communication lines including a communication main line 61, an auxiliary communication line 62, communication branch lines 63a, 63b, 63c, 63d, communication branch lines 64a, 64b, 64c, 64d, 64e and the like, and the plurality of apparatuses operate, exchanging information with one another via communication. In the present embodiment, communication via the communication main line 61 and the communication branch lines 64a, 64b, 64c, 64d, 64e is performed according to Ethernet standards. Also, communication via the auxiliary communication line 62 and the communication branch lines 63a, 63b, 63c, 63d is performed according to CAN communication standards.

The communication main line 61 and the auxiliary communication line 62 are communication lines that pass through the through-hole formed in the dividing wall member described above and are routed into both the vehicle cabin area 100A and the engine room area 100B of the vehicle. The communication main line 61 is a communication line that connects as a pair the first relay apparatus 1 and the second relay apparatus 2. The auxiliary communication line 62 includes a first auxiliary communication line 62a, internal wiring 62b, and a second auxiliary communication line 62c. The first auxiliary communication line 62a connects the first relay apparatus 1 and the second relay apparatus 2. The second auxiliary communication line 62c is a bus-type communication line for connecting the second relay apparatus 2 and the main brake control apparatus 5A and the auxiliary brake control apparatus 5B, and the like. The internal wiring 62b is wiring provided inside the second relay apparatus 2 for electrically connecting the first auxiliary communication line 62a and the second auxiliary communication line 62c. The internal wiring 62b, for example, includes a terminal to which the first auxiliary communication line 62a connects, a terminal to which the second auxiliary communication line 62c connects, and a wiring pattern formed on a circuit board on which these terminals are installed.

The communication branch line 63a is a bus-type communication line for connecting the first relay apparatus 1 and one or more of the apparatuses including the main ADAS 3A. The communication branch line 63b is a bus-type communication line for connecting the first relay apparatus 1 and one or more of the apparatuses including the auxiliary ADAS 3B. The communication branch line 63c is a bus-type communication line for connecting the first relay apparatus 1 and a plurality of apparatuses including the main ADAS 3A and the auxiliary ADAS 3B. The communication branch line 63d is a bus-type communication line for connecting the second relay apparatus 2 and a plurality of apparatuses including the main brake control apparatus 5A and the auxiliary brake control apparatus 5B.

The communication branch line 64a is a communication line that connects as a pair the first relay apparatus 1 and the main ADAS 3A. The communication branch line 64b is a communication line that connects as a pair the first relay apparatus 1 and the auxiliary ADAS 3B. The communication branch line 64c is a communication line that connects as a pair the main ADAS 3A and the first camera 4A. The communication branch line 64d is a communication line that connects as a pair the auxiliary ADAS 3B and the first camera 4A. The communication branch line 64e is a communication line that connects as a pair the second relay apparatus 2 and the second camera 4B.

Regarding the automated driving of the vehicle, for example, degree of automation for the automated driving is indicated by one of six levels (levels 0 to 5) set by the Society of Automatic Engineers (SAE). Automated driving level 0 corresponds to an automobile with no driving automation. Automated driving levels 1 to 3 correspond to partial or limited automated driving, with a driver needing to be in the automobile. Automated driving levels 4 and 5 correspond to limited or complete automated driving, with machine control mainly controlling the driving and thus there being no need for a driver to be in the automobile. The vehicle according to the present embodiment may be a vehicle capable of automated driving from any one of levels 1 to 5.

The main ADAS 3A is a control apparatus that performs driving control relating to the automated driving of the vehicle. The main ADAS 3A controls the operation of controlled apparatuses involved in the driving of the vehicle, such as the main brake control apparatus 5A and the auxiliary brake control apparatus 5B, on the basis of information input from an input apparatus, such as the first camera 4A and the second camera 4B. Automated driving of the vehicle is implemented via control by the main ADAS 3A. The auxiliary ADAS 3B controls the driving of the vehicle in place of the main ADAS 3A when the main ADAS 3A fails or malfunctions. The auxiliary ADAS 3B may be an apparatus with the same configuration as the main ADAS 3A, or may be an apparatus with a different configuration. For example, an apparatus such as a body ECU of the vehicle may execute various items of processing during normal operation, but perform the control of the main ADAS 3A during abnormal operation conditions. However, in the present embodiment, the main ADAS 3A and the auxiliary ADAS 3B have the same configuration.

The first camera 4A is installed near the room mirror of the vehicle and captures images in front of the vehicle, for example. The first camera 4A is connected to the main ADAS 3A via the communication branch line 64c and is connected to the auxiliary ADAS 3B via the communication branch line 64d. The first camera 4A inputs data of images of the front of the vehicle acquired by image capture into the main ADAS 3A and the auxiliary ADAS 3B via the communication branch lines 64c, 64d, respectively. The second camera 4B is installed in the vehicle body front portion of the vehicle and captures images in front of the vehicle, for example. The second camera 4B is connected to the second relay apparatus 2 via the communication branch line 64e. The second camera 4B inputs data of images of the front of the vehicle acquired by image capture into the main ADAS 3A and the auxiliary ADAS 3B via the first relay apparatus 1 and the second relay apparatus 2.

Note that in the present embodiment, the first camera 4A and the second camera 4B are the apparatuses that input information necessary for automated driving of the vehicle. However, no such limitation is intended. The input apparatus may be various apparatuses, such as a sensor that detects objects around the vehicle using ultrasonic waves, a light detection and ranging (LiDAR) apparatus, or the like. In a similar manner to the first camera 4A and the second camera 4B in the present embodiment, these input apparatuses are preferably provided in both the vehicle cabin area 100A and the engine room area 100B.

The main brake control apparatus 5A is an apparatus that controls the braking of the vehicle. The main brake control apparatus 5A activates the braking of the vehicle in response to a control command from the main ADAS 3A or the auxiliary ADAS 3B. In this manner, the main ADAS 3A and the auxiliary ADAS 3B can reduce the speed of the vehicle, bring the vehicle to a stop, and the like. The auxiliary brake control apparatus 5B, in a similar manner to the main brake control apparatus 5A, is an apparatus that controls the braking of the vehicle in response to a control command from the main ADAS 3A or the auxiliary ADAS 3B. The auxiliary brake control apparatus 5B controls the braking in place of the main brake control apparatus 5A when the main brake control apparatus 5A fails or malfunctions. The auxiliary brake control apparatus 5B may be an apparatus with the same configuration as the main brake control apparatus 5A, or may be an apparatus with a different configuration. In the present embodiment, the main brake control apparatus 5A and the auxiliary brake control apparatus 5B have the same configuration.

Note that in the present embodiment, the main brake control apparatus 5A and the auxiliary brake control apparatus 5B are the controlled apparatuses controlled by the main ADAS 3A and the auxiliary ADAS 3B. However, no such limitation is intended. The controlled apparatus may be various apparatuses, such as an apparatus that controls the steering mechanism of the vehicle, an apparatus that controls the acceleration of the vehicle, an apparatus that controls the illumination, i.e., the lights, of the vehicle, and the like. In a similar manner to the main brake control apparatus 5A and the auxiliary brake control apparatus 5B, this controlled apparatus is preferably installed with an auxiliary apparatus that operates during abnormal operation conditions, in addition to the apparatus that operates during normal operation.

The first relay apparatus 1 is provided with a main microcomputer (microcontroller or microcomputer) 11, an auxiliary microcomputer 12, a plurality of CAN controllers 13a to 13d, and a plurality of Ethernet physical layers (PHY) 14a to 14c. Note that in FIG. 1, the CAN controllers are shortened to "CAN", and the Ethernet PHY are shortened to "PHY". In the present embodiment, the first relay apparatus 1 is provided with four CAN controllers 13a to 13d and three Ethernet PHYs 14a to 14c.

Two CAN controllers 13a, 13b and three Ethernet PHYs 14a to 14c are connected to the main microcomputer 11. The main microcomputer 11 receives a message via one of the CAN controllers 13a, 13b or the Ethernet PHYs 14a to 14c and appropriately transmits the message from a different CAN controller 13a, 13b or Ethernet PHY 14a to 14c. In this manner, the main microcomputer 11 executes processing to relay messages. The CAN controller 13a is connected to the main ADAS 3A and the like via the communication branch line 63a. The Ethernet PHY 14a is connected to the main ADAS 3A via the communication branch line 64a. The Ethernet PHY 14c is connected to the second relay apparatus 2 via the communication main line 61. The main microcomputer 11, for example, transmits image data from the second camera 4B received from the second relay apparatus 2 via the Ethernet PHY 14c to the main ADAS 3A via the Ethernet PHY 14a. The main microcomputer 11, for example, transmits a control command from the main ADAS 3A received via the CAN controller 13a to the second relay apparatus 2 via the Ethernet PHY 14c.

The CAN controller 13b is connected to the auxiliary ADAS 3B and the like via the communication branch line 63b. The Ethernet PHY 14b is connected to the auxiliary ADAS 3B via the communication branch line 64b. The main microcomputer 11, for example, transmits image data from the second camera 4B received from the second relay apparatus 2 via the Ethernet PHY 14c to the auxiliary ADAS 3B via the Ethernet PHY 14b. The main microcomputer 11, for example, transmits a control command from the auxiliary ADAS 3B received via the CAN controller 13b to the second relay apparatus 2 via the Ethernet PHY 14c. However, the main microcomputer 11 may only relay messages for the auxiliary ADAS 3B in a case where there is an abnormality in the main ADAS 3A or the like.

Two CAN controllers 13c, 13d are connected to the auxiliary microcomputer 12. The auxiliary microcomputer 12 relays messages by receiving a message via one CAN controller 13c, 13d and transmitting the message to the other CAN controller 13c, 13d. The CAN controller 13c is connected to the main ADAS 3A and the auxiliary ADAS 3B and the like via the communication branch line 63c. The CAN controller 13d is connected to the main brake control apparatus 5A, the auxiliary brake control apparatus 5B, and the like of the engine room area 100B via the auxiliary communication line 62. The auxiliary microcomputer 12 relays messages between the main ADAS 3A and the auxiliary ADAS 3B and the main brake control apparatus 5A and the auxiliary brake control apparatus 5B. However, the auxiliary microcomputer 12 may only relay messages in a case where the main microcomputer 11 cannot relay messages or the like.

The second relay apparatus 2 is provided with a microcomputer 21, a CAN controller 22, Ethernet PHYs 23a, 23b, and the like. The microcomputer 21 executes processing to relay messages by receiving a message via one of the CAN controller 22 or the Ethernet PHYs 23a, 23b and appropriately transmitting the message from a different CAN controller 22 or Ethernet PHY 23a, 23b. The CAN controller 22 is connected to the main brake control apparatus 5A, the auxiliary brake control apparatus 5B, and the like via the communication branch line 63d. The Ethernet PHY 23a is connected to the first relay apparatus 1 via the communication main line 61. The Ethernet PHY 23b is connected to the second camera 4B via the communication branch line 64e.

The microcomputer 21, for example, transmits image data from the second camera 4B received via the Ethernet PHY 23b to the first relay apparatus 1 via the Ethernet PHY 23a. The microcomputer 21, for example, transmits a control command from the first relay apparatus 1 received via the Ethernet PHY 23a to the main brake control apparatus 5A or the auxiliary brake control apparatus 5B via the CAN controller 22.

Also, the second relay apparatus 2 is provided with a circuit board (not illustrated in the diagram) on which the microcomputer 21, the CAN controller 22, the Ethernet PHYs 23a, 23b, and the like are installed. Connectors that the communication main line 61, the first auxiliary communication line 62a and the second auxiliary communication line 62c of the auxiliary communication line 62, the communication branch line 63d, and the communication branch line 64e connect to are installed on the circuit board. The connector that the first auxiliary communication line 62a connects with and the connector that the second auxiliary communication line 62c connects with are electrically connected on the circuit board via the internal wiring 62b. Thus, the CAN controller 13d of the first relay apparatus 1 and the main brake control apparatus 5A, the auxiliary brake control apparatus 5B, and the like are electrically connected bypassing the second relay apparatus 2 and communicatively connected via the auxiliary communication line 62. Note that on the internal wiring 62b of the circuit board, for example, an amplifier circuit that amplifies the communication signal, a filter circuit for noise removal, or the like may be provided. Alternatively, relay processing may be executed with the microcomputer 21, the CAN controller, and the like disposed between the first auxiliary communication line 62a and the second auxiliary communication line 62c.

In the in-vehicle communication system according to the present embodiment, in a normal state in which there is no abnormality or the like relating to communication, the automatic braking control of the vehicle is performed by the main ADAS 3A controlling the main brake control apparatus 5A. The main ADAS 3A determines the situation in front of the vehicle on the basis of images of the front of the vehicle obtained from the first camera 4A and the second camera 4B and controls the brake operation. At this time, the images captured by the first camera 4A are input directly to the main ADAS 3A via the communication branch line 64c. The images captured by the second camera 4B are input to the main ADAS 3A via the communication branch line 64e, the Ethernet PHY 23b, the microcomputer 21, and the Ethernet PHY 23a of the second relay apparatus 2, the communication main line 61, the Ethernet PHY 14c, the main microcomputer 11, and the Ethernet PHY 14a of the first relay apparatus 1, and the communication branch line 64a.

The main ADAS 3A transmits a control command for controlling the brake operation on the basis of the input image data from the first camera 4A and the second camera 4B. However, the main ADAS 3A does not require image data from both the first camera 4A and the second camera 4B and can control the brake operation on the basis of image data from only one. The brake control command by the main ADAS 3A is sent to the main brake control apparatus 5A via the communication branch line 63a, the CAN controller 13a, the main microcomputer 11, and the Ethernet PHY 14c of the first relay apparatus 1, the communication main line 61, the Ethernet PHY 23a, the microcomputer 21, and the CAN controller 22 of the second relay apparatus 2, and the communication branch line 63d. The main brake control apparatus 5A controls the operation of the braking of the vehicle in accordance with the received control command.

In a case where the main ADAS 3A has failed or the like, in place of the main ADAS 3A, the auxiliary ADAS 3B controls the braking. At this time, the images captured by the first camera 4A are input directly to the auxiliary ADAS 3B via the communication branch line 64d. The images captured by the second camera 4B are input to the auxiliary ADAS 3B via the communication branch line 64e, the Ethernet PHY 23b, the microcomputer 21, and the Ethernet PHY 23a of the second relay apparatus 2, the communication main line 61, the Ethernet PHY 14c, the main microcomputer 11, and the Ethernet PHY 14b of the first relay apparatus 1, and the communication branch line 64b. The brake control command by the auxiliary ADAS 3B is sent to the main brake control apparatus 5A via the communication branch line 63b, the CAN controller 13b, the main microcomputer 11, and the Ethernet PHY 14c of the first relay apparatus 1, the communication main line 61, the Ethernet PHY 23a, the microcomputer 21, and the CAN controller 22 of the second relay apparatus 2, and the communication branch line 63d.

For example, in a case where the main brake control apparatus 5A fails or the like, the auxiliary brake control apparatus 5B controls the operation of the braking of the vehicle in place of the main brake control apparatus 5A. The transmitting and receiving path for the control command from the main ADAS 3A or the auxiliary ADAS 3B to the auxiliary brake control apparatus 5B is the same as the transmitting and receiving path for the control command from the main ADAS 3A or the auxiliary ADAS 3B to the main brake control apparatus 5A.

In a case where a malfunction such as wire breakage occurs in the communication main line 61, communication between the first relay apparatus 1 and the second relay apparatus 2 via the communication main line 61 is unable to be performed. In this case, instead of relaying communications using the main microcomputer 11, the first relay apparatus 1 relays communications using the auxiliary microcomputer 12. However, in this case, image data from the second camera 4B is not relayed via the auxiliary communication line 62, and the main ADAS 3A performs control on the basis of the image data from the first camera 4A. The brake control command by the main ADAS 3A is sent to the main brake control apparatus 5A via the communication branch line 63c, the CAN controller 13c, the auxiliary microcomputer 12, the CAN controller 13d, and the auxiliary communication line 62. The same is true in a case where the auxiliary ADAS 3B performs control of the braking.

Configuration

Figure 2:
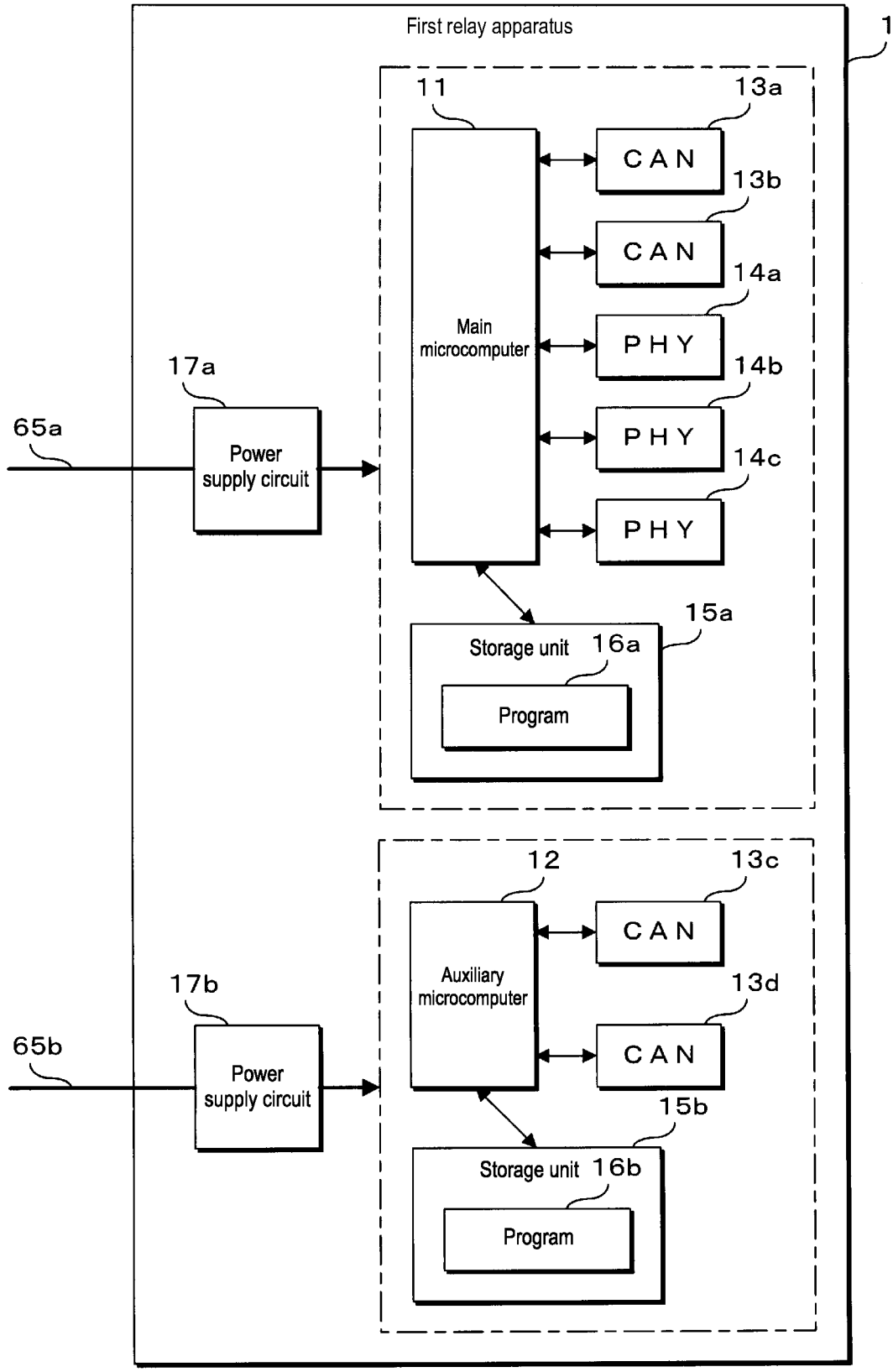
FIG. 2 is a block diagram illustrating the configuration of a first relay apparatus according to the present embodiment.

FIG. 2 is a block diagram illustrating the configuration of the first relay apparatus 1 according to the present embodiment. The first relay apparatus 1 according to the present embodiment is provided with the main microcomputer 11, the auxiliary microcomputer 12, the four CAN controllers 13a to 13d, the three Ethernet PHYs 14a to 14c, two storage units (storage) 15a, 15b, two power supply circuits 17a, 17b, and the like. The main microcomputer 11 executes various types of processing relating to relaying message by reading out and executing a program 16a stored in the storage unit 15a. The storage unit 15a is configured, for example, using a memory element, such as a flash memory, Electrically Erasable Programmable Read Only Memory (EEPROM), and the like. The storage unit 15a stores various programs executed by the main microcomputer 11 and various data required in the processing by the main microcomputer 11.

In a similar manner, the auxiliary microcomputer 12 executes various types of processing relating to relaying message by reading out and executing a program 16b stored in the storage unit 15b. The storage unit 15b is configured, for example, using a memory element, such as a flash memory, EEPROM, and the like. The storage unit 15b stores various programs executed by the auxiliary microcomputer 12 and various data required in the processing by the auxiliary microcomputer 12.

The programs 16a, 16b may be written to the storage units 15a, 15b at the manufacturing stage of the first relay apparatus 1, for example. For example, the programs 16a, 16b may be acquired by the first relay apparatus 1 communicating with a remote server apparatus or the like distributing the programs 16a, 16b. For example, the programs 16a, 16b may be stored on a storage medium, such as a memory card or an optical disk, read out by the first relay apparatus 1, and stored in the storage units 15a, 15b. For example, the programs 16a, 16b may be stored on a storage medium, read out by a writing apparatus, and written to the storage units 15a, 15b of the first relay apparatus 1. The programs 16a, 16b may be provided in the form of being distributed via a network, or may be provided in the form of being stored on a storage medium.

The CAN controllers 13a to 13d perform transmitting and receiving of messages in accordance with a CAN communication protocol via the connected communication lines. The CAN controllers 13a to 13d are each configured as a single IC, for example. The CAN controllers 13a, 13b convert a message for transmission received from the main microcomputer 11 to an electrical signal compliant with CAN communication standards and output the electrical signal to the communication lines to transmit messages to other apparatuses. The CAN controllers 13a, 13b receive messages from other apparatuses by sampling and acquiring the electric potential of the communication lines and send the received messages to the main microcomputer 11. In a similar manner, the CAN controllers 13c, 13d convert a message for transmission received from the auxiliary microcomputer 12 to an electrical signal compliant with CAN communication standards and output the electrical signal to the communication lines to transmit messages to other apparatuses. The CAN controllers 13c, 13d receive messages from other apparatuses by sampling and acquiring the electric potential of the communication lines and send the received messages to the auxiliary microcomputer 12.

The Ethernet PHYs 14a to 14c perform transmitting and receiving of messages in accordance with an Ethernet communication protocol via the connected communication lines. The Ethernet PHYs 14a to 14c are each configured as a single IC, for example. The Ethernet PHYs 14a to 14c convert a message for transmission received from the main microcomputer 11 to an electrical signal compliant with Ethernet communication standards and outputs the electrical signal to the communication lines to transmit messages to other apparatuses. The Ethernet PHYs 14a to 14c receive messages from other apparatuses by sampling and acquiring the electric potential of the communication lines and sends the received messages to the main microcomputer 11.

The power supply circuits 17a, 17b are connected to a battery (not illustrated in the diagram) installed in the vehicle via electric power lines 65a, 65b. The power supply circuits 17a, 17b convert 12V power supplied from the battery to 5V or 3V power, for example. The power supply circuit 17a supplies power to the main microcomputer 11, the CAN controllers 13a, 13b, the Ethernet PHYs 14a to 14c, the storage unit 15a, and the like. The power supply circuit 17b supplies power to the auxiliary microcomputer 12, the CAN controllers 13c, 13d, the storage unit 15b, and the like.

Figure 3:
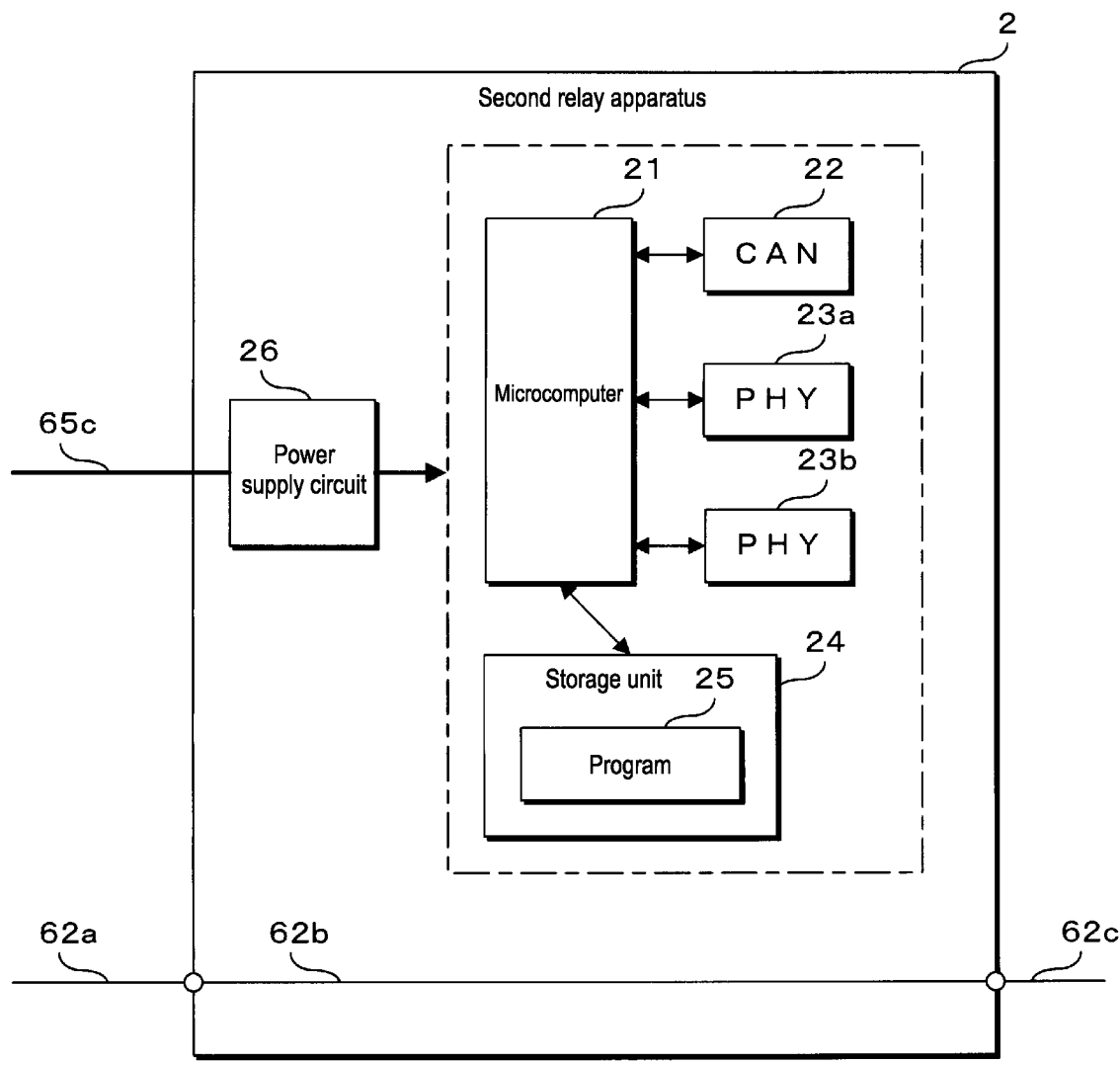
FIG. 3 is a block diagram illustrating the configuration of a second relay apparatus according to the present embodiment.

FIG. 3 is a block diagram illustrating the configuration of the second relay apparatus 2 according to the present embodiment. The second relay apparatus 2 according to the present embodiment is provided with the microcomputer 21, the CAN controller 22, the two Ethernet PHYs 23a, 23b, a storage unit (storage) 24, a power supply circuit 26, the internal wiring 62b, and the like. The microcomputer 21 executes various types of processing relating to relaying message by reading out and executing a program 25 stored in the storage unit 24. The storage unit 24 is configured, for example, using a memory element, such as a flash memory, EEPROM, and the like. The storage unit 24 stores various programs executed by the microcomputer 21 and various data required in the processing by the microcomputer 21.

The program 25 may be written to the storage unit 24 at the manufacturing stage of the second relay apparatus 2, for example. For example, the program 25 may be acquired by the second relay apparatus 2 communicating with a remote server apparatus or the like distributing the program 25. For example, the program 25 may be stored on a storage medium, such as a memory card or an optical disk, read out by the second relay apparatus 2, and stored in the storage unit 24. For example, the program 25 may be stored on a storage medium, read out by a writing apparatus, and written to the storage unit 24 of the second relay apparatus 2. The program 25 may be provided in the form of being distributed via a network, or may be provided in the form of being stored on a storage medium.

The CAN controller 22 performs transmitting and receiving of messages in accordance with a CAN communication protocol via the connected communication lines. The CAN controller 22 is configured as a single IC, for example. The CAN controller 22 converts a message for transmission received from the microcomputer 21 to an electrical signal compliant with CAN communication standards and outputs the electrical signal to the communication lines to transmit messages to other apparatuses. The CAN controller 22 receives messages from other apparatuses by sampling and acquiring the electric potential of the communication line and sends the received messages to the microcomputer 21.

The Ethernet PHYs 23a, 23b perform transmitting and receiving of messages in accordance with an Ethernet communication protocol via the connected communication lines. The Ethernet PHYs 23a, 23b are each configured as a single IC, for example. The Ethernet PHYs 23a, 23b convert a message for transmission received from the microcomputer 21 to an electrical signal compliant with Ethernet communication standards and outputs the electrical signal to the communication lines to transmit messages to other apparatuses. The Ethernet PHYs 23a, 23b receive messages from other apparatuses by sampling and acquiring the electric potential of the communication lines and sends the received messages to the microcomputer 21.

The power supply circuit 26 is connected to a battery installed in the vehicle via an electric power line 65c. The power supply circuit 26 converts 12V power supplied from the battery to 5V or 3V power, for example. The power supply circuit 26 supplies power to the microcomputer 21, the CAN controller 22, the Ethernet PHYs 23a, 23b, the storage unit 24, and the like.

The internal wiring 62b, for example, may be provided as a wiring pattern on a circuit board on which is installed the microcomputer 21, the CAN controller 22, the Ethernet PHYs 23a, 23b, the storage unit 24, and the power supply circuit 26. The second relay apparatus 2 is provided with a terminal to which the first auxiliary communication line 62a of the auxiliary communication line 62 connects and a terminal to which the second auxiliary communication line 62c connects. The internal wiring 62b is a wiring pattern for electrically connecting these two terminals.

Figure 4:
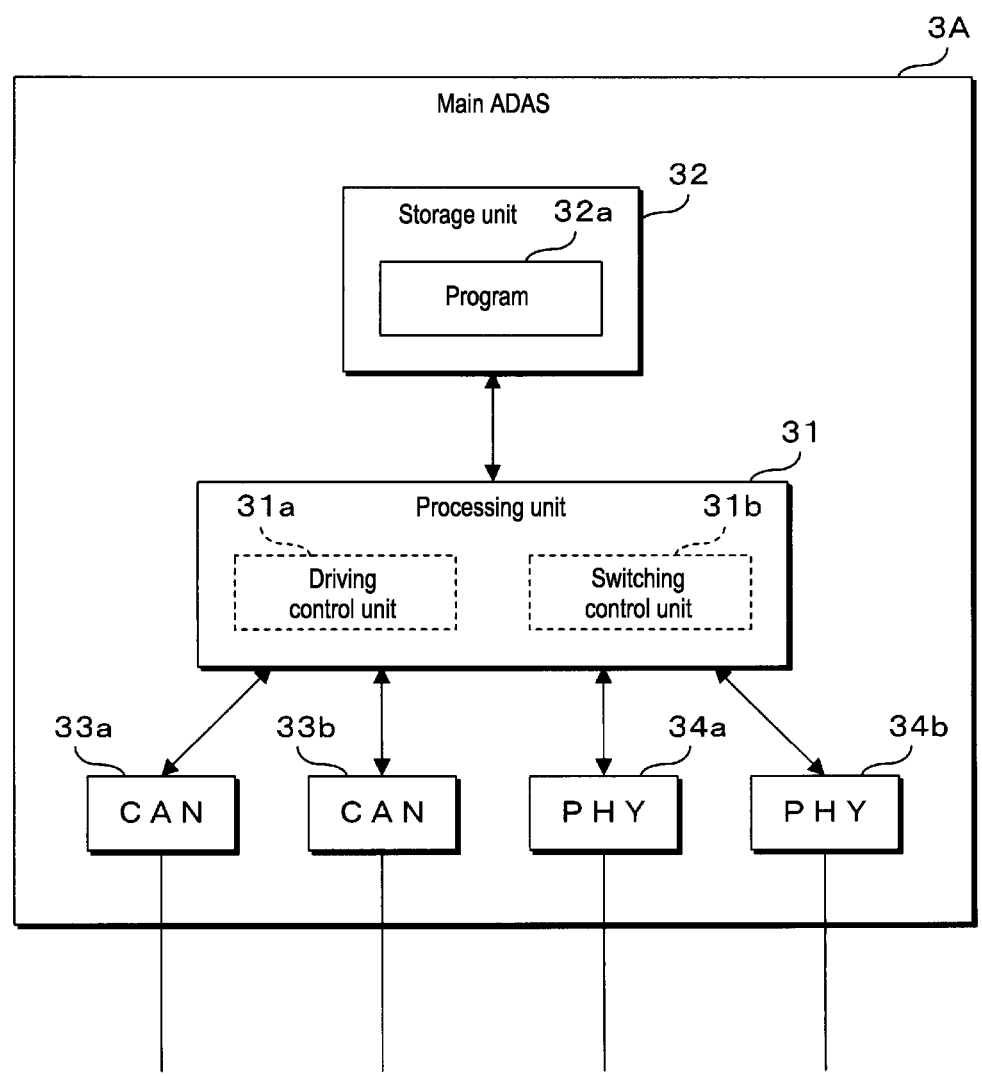
FIG. 4 is a block diagram illustrating the configuration of a main ADAS according to the present embodiment.

FIG. 4 is a block diagram illustrating the configuration of the main ADAS 3A according to the present embodiment. Note that the configuration of the auxiliary ADAS 3B according to the present embodiment is the same as the configuration of the main ADAS 3A, and thus the auxiliary ADAS 3B is not illustrated in the block diagram and a description is omitted. The main ADAS 3A according to the present embodiment is provided with a processing unit (processor) 31, a storage unit (storage) 32, two CAN controllers 33a, 33b, and two Ethernet PHYs 34a, 34b. The processing unit 31 is configured using an arithmetic processing apparatus, such as a Central Processing Unit (CPU), a Micro-Processing Unit (MPU), or the like. The processing unit 31 performs driving control relating to the automated driving of the vehicle and executes various types of processing including switching between automated driving and manual driving by reading out and executing a program 32a stored in the storage unit 32.

The storage unit 32 is configured, for example, using a memory element, such as a flash memory, EEPROM, and the like. The storage unit 32 stores various programs executed by the processing unit 31 and various data required in the processing by the processing unit 31. The program 32a may be written to the storage unit 32 at the manufacturing stage of the main ADAS 3A, for example. For example, the program 32a may be acquired by the main ADAS 3A communicating with a remote server apparatus or the like distributing the program 32a. For example, the program 32a may be stored on a storage medium, such as a memory card or an optical disk, read out by the main ADAS 3A, and stored in the storage unit 32. For example, the program 32a may be stored on a storage medium, read out by a writing apparatus, and written to the storage unit 32 of the main ADAS 3A. The program 32a may be provided in the form of being distributed via a network, or may be provided in the form of being stored on a storage medium.

The CAN controllers 33a, 33b perform transmitting and receiving of messages in accordance with a CAN communication protocol via the connected communication lines. The CAN controllers 33a, 33b are each configured as a single IC, for example. The CAN controllers 33a, 33b convert a message for transmission received from the processing unit 31 to an electrical signal compliant with CAN communication standards and output the electrical signal to the communication lines to transmit messages to other apparatuses. The CAN controllers 33a, 33b receive messages from other apparatuses by sampling and acquiring the electric potential of the communication lines and send the received messages to the processing unit 31.

The Ethernet PHYs 34a, 34b perform transmitting and receiving of messages in accordance with an Ethernet communication protocol via the connected communication lines. The Ethernet PHYs 34a, 34b are each configured as a single IC, for example. The Ethernet PHYs 34a, 34b convert a message for transmission received from the processing unit 31 to an electrical signal compliant with Ethernet communication standards and outputs the electrical signal to the communication lines to transmit messages to other apparatuses. The Ethernet PHYs 34a, 34b receive messages from other apparatuses by sampling and acquiring the electric potential of the communication lines and sends the received messages to the processing unit 31.

Also, in the main ADAS 3A according to the present embodiment, a driving control unit 31a, a switching control unit 31b, and the like are implemented in the processing unit 31 as a software functional block by the program 32a stored in the storage unit 32 being read out and executed by the processing unit 31. However, these functional blocks may be implemented as hardware. The driving control unit 31a executes processing to control the driving of the vehicle by controlling the operations of the main brake control apparatus 5A, the auxiliary brake control apparatus 5B, and the like on the basis of information input from an input apparatus, such as the first camera 4A and the second camera 4B. Controlling the driving of the vehicle includes controlling operations such as the acceleration and deceleration of the vehicle, stopping the vehicle, left and right steering operations, turning on and off direction indicators, headlights, and the like, operating the wipers, and the like. Further details of the driving control of the vehicle are omitted from the description.

The switching control unit 31b, for example, executes processing to switch between manual driving of the vehicle to automated driving in response to a user operation on a switch provided in the vehicle cabin of the vehicle. In a case where a switch instruction from manual driving to automated driving is sent, the switching control unit 31b determines whether or not the communication is possible with both a communication path via the communication main line 61 and a communication path via the auxiliary communication line 62. In a case where communication with both communication paths is possible, the switching control unit 31b switches from manual driving to automated driving. In a case where communication is not possible with either one of the communication paths, the switching control unit 31b does not switch from manual driving to automated driving and displays a warning message or the like. In a case where a switch instruction from automated driving to manual driving is sent, the switching control unit 31b determines whether or not to switch on the basis of whether or not a driver is in the driver seat of the vehicle, whether or not the driver is in a state capable of driving, and the like.

Communication Path Switch Processing

In the in-vehicle communication system according to the present embodiment, there are two communication paths for transmitting and receiving messages between the vehicle cabin area 100A and the engine room area 100B of the vehicle. One is a communication path via the communication main line 61, and the other is a communication path via the auxiliary communication line 62. In the in-vehicle communication system, during a normal state in which there are no abnormalities in communications, messages are transmitted and received between the vehicle cabin area 100A and the engine room area 100B using the communication path via the communication main line 61. In a case where there is an abnormality in the communication path via the communication main line 61, messages are transmitted and received between the vehicle cabin area 100A and the engine room area 100B using the communication path via the auxiliary communication line 62. The switch from transmitting and receiving messages using the communication path via the communication main line 61 to transmitting and receiving messages using the communication path via the auxiliary communication line 62 may be performed in response to initiation by any one of the apparatuses included in the in-vehicle communication system. Next, a case of the first relay apparatus 1 performing the communication path switch and a case of the ADAS performing the communication path switch will be described.

1. A case of the First Relay Apparatus 1 Performing the Communication Path Switch The auxiliary microcomputer 12 of the first relay apparatus 1 periodically checks the operation status and the like of the main microcomputer 11 and determines whether or not there is an abnormality in the main microcomputer 11. In a case where there is an abnormality in the main microcomputer 11, the auxiliary microcomputer 12 stops the main microcomputer 11. Then, the auxiliary microcomputer 12 starts relaying messages between the communication branch line 63c connected to the CAN controller 13c and the auxiliary communication line 62 connected to the CAN controller 13d. At this time, the main microcomputer 11 may transmit from the CAN controllers 13c, 13d a message to notify that the communication path will switch. In response to the notification message, the apparatuses connected to the communication branch line 63c, such as the main ADAS 3A and the auxiliary ADAS 3B, and the apparatuses connected to the auxiliary communication line 62, such as the main brake control apparatus 5A and the auxiliary brake control apparatus 5B, switch communication paths for transmitting and receiving messages.

Figure 5:
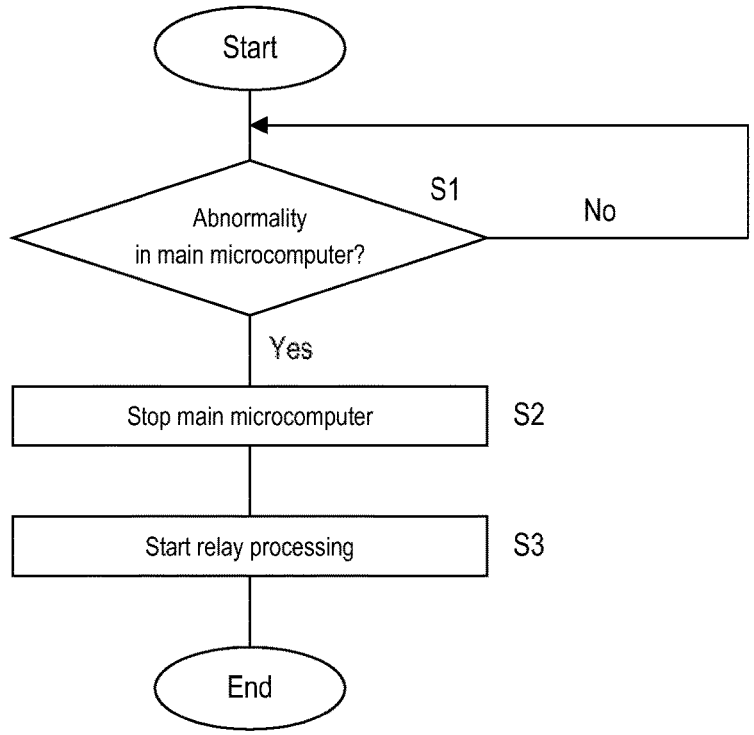
FIG. 5 is a flowchart illustrating the process of the processing for switching communication paths executed by the first relay apparatus according to the present embodiment.

FIG. 5 is a flowchart illustrating the process of the processing for switching communication paths executed by the first relay apparatus 1 according to the present embodiment. The auxiliary microcomputer 12 of the first relay apparatus 1 according to the present embodiment determines whether or not there is an abnormality in the main microcomputer 11 (step S1). In a case where there is no abnormality (NO in step S1), the auxiliary microcomputer 12 is put on standby until an abnormality occurs in the main microcomputer 11. In a case where there is an abnormality (YES in step S1), the auxiliary microcomputer 12 stops the operations of the main microcomputer 11 (step S2). Next, the auxiliary microcomputer 12 starts executing relay processing of messages received via the CAN controllers 13c, 13d (step S3), and then the switch processing ends.

2. A case of the ADAS Performing the Communication Path Switch

The processing unit 31 of the main ADAS 3A determines whether or not there is an abnormality in the communication path via the communication main line 61. The processing unit 31, for example, checks, via communications via the communication branch line 63a or the communication branch line 64a, whether or not there is a message from the second camera 4B, the main brake control apparatus 5A, the auxiliary brake control apparatus 5B, or the like installed in the engine room area 100B of the vehicle. In a case where a message has not been received for a predetermined time period, the processing unit 31 can determine that an abnormality has occurred in the communication path via the communication main line 61. In a case where an abnormality is determined to have occurred, the processing unit 31 stops the communications using the communication path via the communication main line 61 and starts communications using the communication path via the auxiliary communication line 62. At this time, the processing unit 31 may transmit a message to one or more apparatuses connected to the communication path via the auxiliary communication line 62 to instruct them to switch communication paths. In a case where the main ADAS 3A has failed and the auxiliary ADAS 3B is controlling the driving of the vehicle, in a similar manner, the auxiliary ADAS 3B executes the switch processing of the communication paths.

Figure 6:
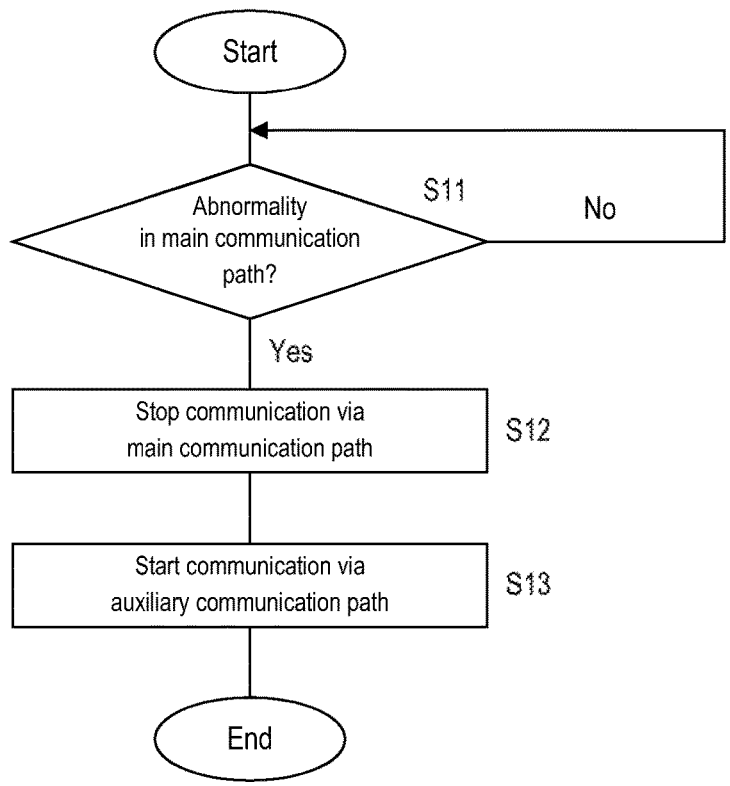
FIG. 6 is a flowchart illustrating the process of the processing for switching communication paths executed by the main ADAS according to the present embodiment.

FIG. 6 is a flowchart illustrating the process of the processing for switching communication paths executed by the main ADAS 3A according to the present embodiment. Note that in the diagrams, the communication path via the communication main line 61 is shortened to "main communication path", and the communication path via the auxiliary communication line 62 is shortened to "auxiliary communication path". The processing unit 31 of the main ADAS 3A according to the present embodiment determines whether or not there is an abnormality in the communication path via the communication main line 61 (step S11). In a case where it is determined that there is no abnormality (NO in step S11), the processing unit 31 is put on standby without switching the communication paths until an abnormality occurs. In a case where it is determined that there is an abnormality (YES in step S11), the processing unit 31 stops the communications using the communication path via the communication main line 61 (step S12). Next, the processing unit 31 starts communications using the communication path via the auxiliary communication line 62 (step S13), and then ends the switch processing.

Processing for Switching from Manual Driving to Automated Driving

In the in-vehicle communication system according to the present embodiment, for example, in response to a user operation on a switch or the like provided in the vehicle cabin of the vehicle, switching the vehicle from manual driving to automated driving is performed. In a case where the user performed an operation to switch from manual driving to automated driving, the main ADAS 3A checks whether or not there is an abnormality in the apparatuses involved in automated driving installed in the vehicle, the system, and the like. In a case where it is determined that there are not abnormalities, the main ADAS 3A performs switching to automated driving. In a case where it is determined that there is an abnormality, the main ADAS 3A, without performing switching to automated driving, displays a warning message or the like on a display in the vehicle cabin to notify that an abnormality relating to automated driving has occurred.

In the present embodiment, in a case where there is a request to switch from manual driving to automated driving, the main ADAS 3A determines whether or not there is an abnormality in the communication using the communication path via the communication main line 61 and in the communication using the communication path via the auxiliary communication line 62. In a case where there are no abnormalities in either communication paths, the main ADAS 3A performs switching from manual driving to automated driving and starts controlling the main brake control apparatus 5A, the auxiliary brake control apparatus 5B, and the like on the basis of information input from the first camera 4A, the second camera 4B, and the like. In a case where there is an abnormality in either one of the communication paths, the main ADAS 3A displays a warning message without performing switching from manual driving to automated driving.

The apparatus such as the display that displays the warning message, for example, is installed in the vehicle cabin area 100A of the vehicle and is connected to the main ADAS 3A or the first relay apparatus 1 via a communication branch line. The main ADAS 3A can display a warning message by communicating with the apparatus such as the display via a communication branch line and the first relay apparatus 1.

Figure 7:
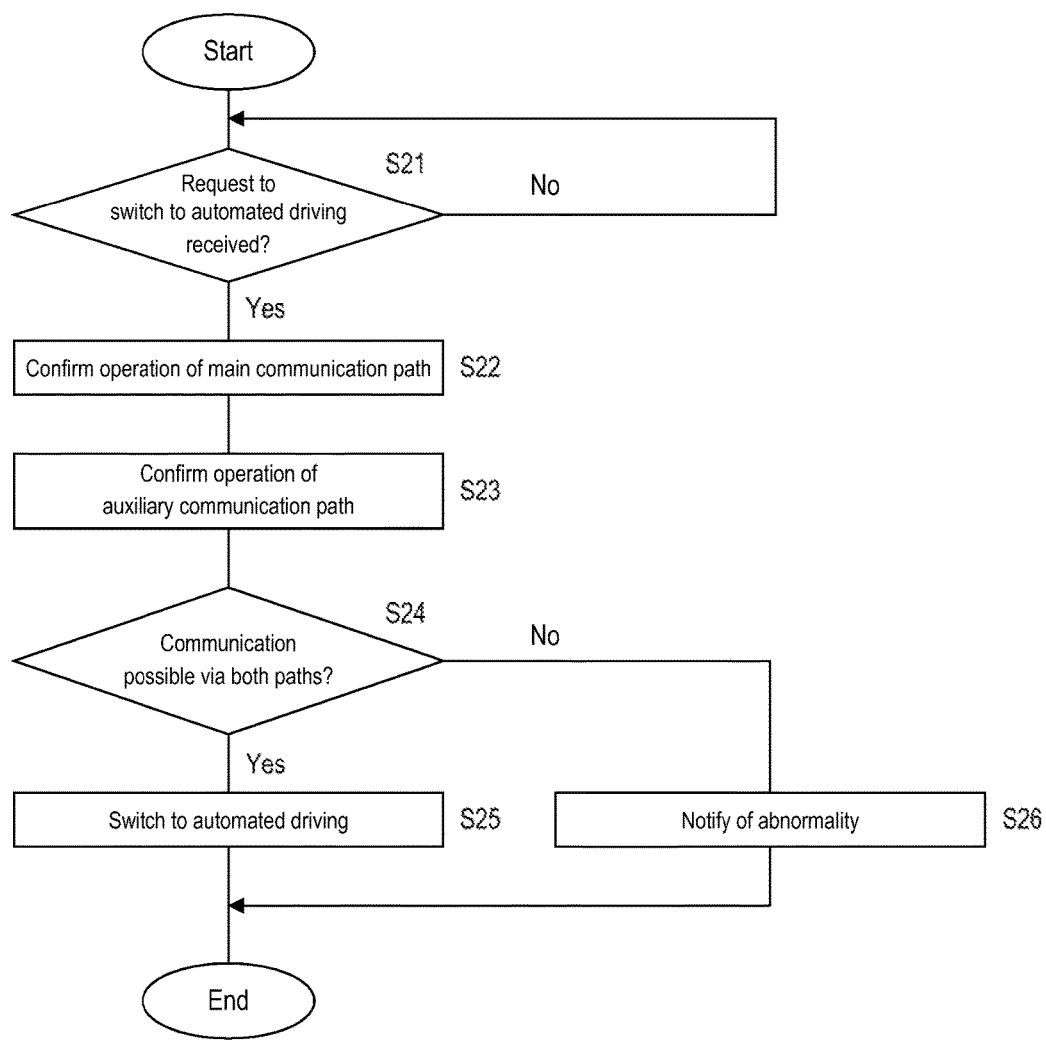
FIG. 7 is a flowchart illustrating the process of the processing for performing switching from manual driving to automated driving executed by the main ADAS according to the present embodiment.

FIG. 7 is a flowchart illustrating the process of the processing for performing switching from manual driving to automated driving executed by the main ADAS 3A according to the present embodiment. Note that in the diagrams, the communication path via the communication main line 61 is shortened to "main communication path", and the communication path via the auxiliary communication line 62 is shortened to "auxiliary communication path". The switching control unit 31b of the processing unit 31 of the main ADAS 3A according to the present embodiment determines whether or not a request to switch from manual driving to automated driving has been received via user operation (step S21). In a case where a switch request has not been received (NO in step S21), the switching control unit 31b does not switch from manual driving and is put on standby until a switch request is received.

In a case where a switch request is received (YES in step S21), the switching control unit 31b confirms the operations of the communication path via the communication main line 61 (step S22). At this time, the switching control unit 31b transmits a message to confirm the operation of the second relay apparatus 2, the main brake control apparatus 5A, the auxiliary brake control apparatus 5B, the second camera 4B, and the like using the communication path via the communication main line 61, for example. The switching control unit 31b can confirm the operations on the basis of whether or not a reply to the message is received. Next, the switching control unit 31b confirms the operations of the communication path via the auxiliary communication line 62 (step S23). At this time, the switching control unit 31b transmits a message to confirm the operation of the main brake control apparatus 5A, the auxiliary brake control apparatus 5B, and the like using the communication path via the auxiliary communication line 62, for example, and can confirm the operations by receiving a reply to the message.

The switching control unit 31b determines whether or not communication is possible with both communication paths, i.e., the communication path via the communication main line 61 and the communication path via the auxiliary communication line 62, on the basis of the operation confirmation results of steps S22 and S23 (step S24). In a case where communication with both communication paths is possible (YES in step S24), the switching from manual driving to automated driving is performed by the switching control unit 31b (step S25), and the processing ends. In a case where communication is not possible with either one of the communication paths (NO in step S24), the switching control unit 31b issues an abnormality notification by displaying a warning message on the display or the like (step S26), and the processing ends.

SUMMARY

In the in-vehicle communication system according to the present embodiment with the configuration described above, the area inside the vehicle where various apparatuses can be installed is divided into at least two areas, the vehicle cabin area 100A and the engine room area 100B. In the vehicle cabin area 100A, the main ADAS 3A and the auxiliary ADAS 3B that perform driving control of the vehicle, the first relay apparatus 1 that relays communications, and the first camera 4A that inputs information used in the driving control are installed. In the engine room area 100B, the main brake control apparatus 5A and the auxiliary brake control apparatus 5B controlled by the main ADAS 3A and the auxiliary ADAS 3B, the second relay apparatus 2 that relays communications, and the second camera 4B that inputs information used in the driving control are installed. The first relay apparatus 1 and the second relay apparatus 2 are connected via the communication main line 61 running into both of the two areas. The first relay apparatus 1 and the main brake control apparatus 5A and the auxiliary brake control apparatus 5B are connected via the auxiliary communication line 62 running into both of the two areas.

In this manner, the main ADAS 3A and the auxiliary ADAS 3B provided in the vehicle cabin area 100A can communicate with the main brake control apparatus 5A and the auxiliary brake control apparatus 5B provided in the engine room area 100B using two communication paths. Even in a case where a malfunction has occurred in either one of the communication paths, the main ADAS 3A and the auxiliary ADAS 3B can communicate with the main brake control apparatus 5A and the auxiliary brake control apparatus 5B using the other communication path. Thus, the reliability relating to the in-vehicle communication system communications can be enhanced.

In the in-vehicle communication system according to the present embodiment, two control apparatuses, the main ADAS 3A and the auxiliary ADAS 3B, are installed in the vehicle. Accordingly, even in a case where a malfunction has occurred in either one of the control apparatuses, the other control apparatus can control the main brake control apparatus 5A and the auxiliary brake control apparatus 5B. In the in-vehicle communication system according to the present embodiment, the first camera 4A is installed in the vehicle cabin area 100A, and the second camera 4B is installed in the engine room area 100B. Accordingly, even in a case where a malfunction has occurred in either one of the cameras, the other camera can input information to the main ADAS 3A and the auxiliary ADAS 3B. In the in-vehicle communication system according to the present embodiment, two brake control apparatuses, the main brake control apparatus 5A and the auxiliary brake control apparatus 5B, are installed in the vehicle. Accordingly, even in a case where a malfunction has occurred in either one of the brake control apparatuses, the main ADAS 3A and the auxiliary ADAS 3B can control the operation of the other brake control apparatus and control the braking of the vehicle.

In the in-vehicle communication system according to the present embodiment, the auxiliary communication line 62 that connects the main ADAS 3A and the auxiliary ADAS 3B of the vehicle cabin area 100A and the main brake control apparatus 5A and the auxiliary brake control apparatus 5B of the engine room area 100B is provided divided into a plurality of lines. The auxiliary communication line 62 includes the first auxiliary communication line 62a, the internal wiring 62b, and the second auxiliary communication line 62c. The first auxiliary communication line 62a is a communication line that connects the first relay apparatus 1 and the second relay apparatus 2. The second auxiliary communication line 62c is a communication line that connects the second relay apparatus 2 and the main brake control apparatus 5A and the auxiliary brake control apparatus 5B. The internal wiring 62b is wiring provided inside the second relay apparatus 2 that electrically connects the first auxiliary communication line 62a and the second auxiliary communication line 62c. In this manner, because the communication main line 61 and the auxiliary communication line 62 provided running into both the vehicle cabin area 100A and the engine room area 100B of the vehicle are both connected to the first relay apparatus 1 and the second relay apparatus 2, connecting the communication lines and the like can be simplified.

In the in-vehicle communication system according to the present embodiment, the communication main line 61 is a communication line that connects as a pair the first relay apparatus 1 and the second relay apparatus 2. The communication main line 61, for example, is a communication line compliant with Ethernet communication standards. The auxiliary communication line 62 is a bus-type communication line that connects the first relay apparatus 1 and a plurality of apparatuses, such as the main brake control apparatus 5A and the auxiliary brake control apparatus 5B. The auxiliary communication line 62 is a communication line compliant with CAN communication standards, for example. The communication main line 61 compliant with Ethernet communication standards is a communication line capable of high-speed communication of 100 Mbps, for example, and the auxiliary communication line 62 compliant with CAN communication standards is a communication line capable of low-speed communication of 1 Mbps, for example. Accordingly, an increase in the cost of the in-vehicle communication system can be suppressed by providing the auxiliary communication line 62.

The first relay apparatus 1 according to the present embodiment is provided with the two microcomputers, the main microcomputer 11 and the auxiliary microcomputer 12, and the two power supply circuits 17a, 17b. The main microcomputer 11 executes processing to relay communications between the main ADAS 3A and the auxiliary ADAS 3B and the second relay apparatus 2 via the communication main line 61. The auxiliary microcomputer 12 executes processing to relay messages between the main ADAS 3A and the auxiliary ADAS 3B and the main brake control apparatus 5A and the auxiliary brake control apparatus 5B via the auxiliary communication line 62. The power supply circuit 17a supplies power to the main microcomputer 11. The power supply circuit 17b supplies power to the auxiliary microcomputer 12. By two sets of a microcomputer and a power supply circuit being provided in the first relay apparatus 1, the resistance against the first relay apparatus 1 malfunctioning or the like can be increased.

In the first relay apparatus 1 according to the present embodiment, the auxiliary microcomputer 12 determines whether or not there is an abnormality relating to processing of the main microcomputer 11. In a case where it is determined that there is an abnormality, the auxiliary microcomputer 12 executes processing to relay messages via the auxiliary communication line 62. In this manner, the first relay apparatus 1 can switch between communicating via the communication main line 61 and communicating via the auxiliary communication line 62.

In the present embodiment, the vehicle is installed with an automated driving function and is capable of switching between manual driving and the automated driving depending on the occupant of the vehicle. The main ADAS 3A and the auxiliary ADAS 3B perform driving control relating to automated driving of the vehicle. In a case where a request to switch from manual driving to automated driving is received, the main ADAS 3A and the auxiliary ADAS 3B determine whether or not communication via the communication main line 61 and communication via the auxiliary communication line 62 are possible. In a case where communication via both the communication main line 61 and the auxiliary communication line 62 is possible, the main ADAS 3A and the auxiliary ADAS 3B perform switching to automated driving. In a case where communication via either one of the communication main line 61 or the auxiliary communication line 62 is not possible, the main ADAS 3A and the auxiliary ADAS 3B do not perform switching to automated driving. In this manner, switching from manual driving to automated driving in a reduced communication reliability state can be prevented.

Note that in the present embodiment, the apparatus that inputs information to the main ADAS 3A and the auxiliary ADAS 3B is a camera. However, no such limitation is intended. The input apparatus may be various apparatuses, such as an ultrasonic wave sensor, a LiDAR, or the like. In the present embodiment, the main brake control apparatus 5A and the auxiliary brake control apparatus 5B are the controlled apparatuses controlled by the main ADAS 3A and the auxiliary ADAS 3B. However, no such limitation is intended. The controlled apparatus may be various apparatuses, such as a steering apparatus, an accelerator, an indicator, a light, a wiper, and the like. Also, the control apparatus that controls the driving of the vehicle is the ADAS. However, no such limitation is intended. The control apparatus may be various apparatuses other than an ADAS.

In the present embodiment, the area in which the apparatuses of the vehicle can be installed is divided into two, the vehicle cabin area 100A and the engine room area 100B. However, no such limitation is intended. The apparatus installation area may be divided into three or more areas, with the communication main line and the auxiliary communication line being provided for communication between two areas. In the present embodiment, the arrangement of the apparatuses and connections of the communication lines illustrated in FIG. 1 is an example, and no such limitation is intended. Regarding the apparatuses illustrated in FIGS. 2 to 4, the number of installed CAN controllers and the number of installed Ethernet PHYs are examples, and no such limitation is intended. The communication line compliant with Ethernet communication standards is the communication main line 61, and the communication line compliant with CAN communication standards is the auxiliary communication line 62, however no such limitation is intended. For example, the communication main line 61 and the auxiliary communication line 62 may both be communication lines compliant with Ethernet communication standards. The communication main line 61 and the auxiliary communication line 62 may both be communication lines compliant with CAN communication standards. The communication main line 61 and the auxiliary communication line 62 may be communication lines compliant with communication standards other than Ethernet and CAN. The communication standard may be selected as appropriate.

The devices of the in-vehicle communication system are provided with a computer that includes a microprocessor, ROM, RAM, and the like. The arithmetic processing unit of the microprocessor or the like may be executed by reading out a computer program including a portion or all of the steps of the sequence diagram or flowchart such as those illustrated in FIGS. 5 to 7 from a storage unit, such as ROM, RAM, or the like. The computer program of these devices may be installed from an external server device or the like. Also, the computer program of these devices may be distributed while stored in a recording medium, such as a CD-ROM, a DVD-ROM, a semiconductor memory, and the like.

The embodiments disclosed herein are examples in all respects and should not be interpreted as limiting in any manner. The present invention is defined not by the foregoing description, but by the scope of the claims, and all modifications that are equivalent to or within the scope of the claims are included.

The invention claimed is:

1. An in-vehicle communication system, comprising:
   a first relay apparatus installed in a first area of a vehicle;
   a second relay apparatus installed in a second area of the vehicle, the second relay apparatus being connected to the first relay apparatus via a communication main line that runs into both the first area and the second area;
   a main control apparatus and an auxiliary control apparatus installed in the first area, the main control apparatus and the auxiliary control apparatus being connected to the first relay apparatus via a communication branch line and performing driving control of the vehicle;
   a controlled apparatus installed in the second area, the controlled apparatus being connected to the second relay apparatus via a communication branch line and being controlled by the main control apparatus or the auxiliary control apparatus;
   a first input apparatus installed in the first area, the first input apparatus inputting information used in the driving control to the main control apparatus or the auxiliary control apparatus; and
   a second input apparatus installed in the second area, the second input apparatus being connected to the second relay apparatus via a communication branch line and inputting information used in the driving control to the main control apparatus or the auxiliary control apparatus via the first relay apparatus and the second relay apparatus, wherein the first relay apparatus and the controlled apparatus communicate via an auxiliary communication line provided running into both the first area and the second area;

in a case where communications via the communication main line are not possible, the main control apparatus and the auxiliary control apparatus communicate with the controlled apparatus via the auxiliary communication line; and in a case where the main control apparatus cannot control the controlled apparatus, the auxiliary control apparatus controls the controlled apparatus.

2. The in-vehicle communication system according to claim 1, wherein the auxiliary communication line includes
a first auxiliary communication line that connects the first relay apparatus and the second relay apparatus and runs into both the first area and the second area,
a second auxiliary communication line that connects the second relay apparatus and the controlled apparatus, and
internal wiring provided inside the second relay apparatus that electrically connects the first auxiliary communication line and the second auxiliary communication line.

3. The in-vehicle communication system according to claim 1, wherein the communication main line is a high-speed communication line that connects the first relay apparatus and the second relay apparatus as a pair; and
the auxiliary communication line is a bus-type low-speed communication line that connects the first relay apparatus and the controlled apparatus.

4. The in-vehicle communication system according to claim 1, wherein the first relay apparatus includes a main processing unit, an auxiliary processing unit, a main power supply circuit, and an auxiliary power supply circuit;
the main processing unit executes processing to relay communications between the main control apparatus and the auxiliary control apparatus and the second relay apparatus via the communication main line;
the auxiliary processing unit executes processing to relay communications between the main control apparatus and the auxiliary control apparatus and the controlled apparatus via the auxiliary communication line;
the main power supply circuit supplies power to the main processing unit; and
the auxiliary power supply circuit supplies power to the auxiliary processing unit.

5. The in-vehicle communication system according to claim 4, wherein the auxiliary processing unit determines whether or not there is an abnormality in the main processing unit and, in a case where there is an abnormality, executes relay processing via the auxiliary communication line.

6. The in-vehicle communication system according to claim 1, wherein the main control apparatus and the auxiliary control apparatus each
are an apparatus that performs driving control relating to automated driving of the vehicle,
determine whether or not communications via the communication main line and the auxiliary communication line are possible in a case where a request to switch the vehicle from manual driving to automated driving is received, and perform switching to automated driving in a case where communications via the communication main line and the auxiliary communication line are possible.

7. An in-vehicle relay apparatus installed in a vehicle, comprising:
a main processing unit;
an auxiliary processing unit;
a main power supply circuit; and
an auxiliary power supply circuit, wherein
the main power supply circuit supplies power to the main processing unit;
the auxiliary power supply circuit supplies power to the auxiliary processing unit;
the main processing unit executes processing to relay, via a communication main line, communications between a main control apparatus and an auxiliary control apparatus that perform driving control of the vehicle and another relay apparatus connected with a controlled apparatus controlled by the main control apparatus and the auxiliary control apparatus; and
the auxiliary processing unit determines whether or not there is an abnormality in processing relating to relay by the main processing unit and,
in a case where there is an abnormality, executes processing to relay, via an auxiliary communication line, communications between the main control apparatus and the auxiliary control apparatus and the controlled apparatus.

8. An in-vehicle control apparatus installed in a vehicle capable of switching between automated driving and manual driving for performing driving control of the vehicle, comprising:
a processing unit, wherein
the processing unit
determines whether or not communications with a controlled apparatus via a communication main line and communications with the controlled apparatus via an auxiliary communication line are possible in a case where a request to switch the vehicle from manual driving to automated driving is received, and
performs switching to automated driving in a case where communications via the communication main line and the auxiliary communication line are possible.

9. The in-vehicle communication system according to claim 2, wherein the communication main line is a high-speed communication line that connects the first relay apparatus and the second relay apparatus as a pair; and
the auxiliary communication line is a bus-type low-speed communication line that connects the first relay apparatus and the controlled apparatus.

10. The in-vehicle communication system according to claim 2, wherein the first relay apparatus includes a main processing unit, an auxiliary processing unit, a main power supply circuit, and an auxiliary power supply circuit;
the main processing unit executes processing to relay communications between the main control apparatus and the auxiliary control apparatus and the second relay apparatus via the communication main line;
the auxiliary processing unit executes processing to relay communications between the main control apparatus and the auxiliary control apparatus and the controlled apparatus via the auxiliary communication line;
the main power supply circuit supplies power to the main processing unit; and
the auxiliary power supply circuit supplies power to the auxiliary processing unit.

11. The in-vehicle communication system according to claim 3, wherein the first relay apparatus includes a main processing unit, an auxiliary processing unit, a main power supply circuit, and an auxiliary power supply circuit;

the main processing unit executes processing to relay communications between the main control apparatus and the auxiliary control apparatus and the second relay apparatus via the communication main line;

the auxiliary processing unit executes processing to relay communications between the main control apparatus and the auxiliary control apparatus and the controlled apparatus via the auxiliary communication line;

the main power supply circuit supplies power to the main processing unit; and the auxiliary power supply circuit supplies power to the auxiliary processing unit.

12. The in-vehicle communication system according to claim 2, wherein the main control apparatus and the auxiliary control apparatus each are an apparatus that performs driving control relating to automated driving of the vehicle, determine whether or not communications via the communication main line and the auxiliary communication line are possible in a case where a request to switch the vehicle from manual driving to automated driving is received, and perform switching to automated driving in a case where communications via the communication main line and the auxiliary communication line are possible.

13. The in-vehicle communication system according to claim 3, wherein the main control apparatus and the auxiliary control apparatus each are an apparatus that performs driving control relating to automated driving of the vehicle, determine whether or not communications via the communication main line and the auxiliary communication line are possible in a case where a request to switch the vehicle from manual driving to automated driving is received, and perform switching to automated driving in a case where communications via the communication main line and the auxiliary communication line are possible.

14. The in-vehicle communication system according to claim 4, wherein the main control apparatus and the auxiliary control apparatus each are an apparatus that performs driving control relating to automated driving of the vehicle, determine whether or not communications via the communication main line and the auxiliary communication line are possible in a case where a request to switch the vehicle from manual driving to automated driving is received, and perform switching to automated driving in a case where communications via the communication main line and the auxiliary communication line are possible.

15. The in-vehicle communication system according to claim 5, wherein the main control apparatus and the auxiliary control apparatus each are an apparatus that performs driving control relating to automated driving of the vehicle, determine whether or not communications via the communication main line and the auxiliary communication line are possible in a case where a request to switch the vehicle from manual driving to automated driving is received, and perform switching to automated driving in a case where communications via the communication main line and the auxiliary communication line are possible.

* * * * *